United States Patent
Miyamoto et al.

(10) Patent No.: US 10,625,199 B2
(45) Date of Patent: Apr. 21, 2020

(54) $CO_2$ RECOVERY SYSTEM AND METHOD OF RECOVERING $CO_2$

(71) Applicant: Mitsubishi Heavy Industries Engineering, Ltd., Kanagawa (JP)

(72) Inventors: Osamu Miyamoto, Houston, TX (US); Tatsuya Tsujiuchi, Tokyo (JP); Takashi Kamijo, Kanagawa (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 159 days.

(21) Appl. No.: 15/908,910

(22) Filed: Mar. 1, 2018

(65) Prior Publication Data

US 2019/0270046 A1    Sep. 5, 2019

(51) Int. Cl.
*B01D 53/14* (2006.01)
*B01D 53/18* (2006.01)

(52) U.S. Cl.
CPC ..... *B01D 53/1418* (2013.01); *B01D 53/1412* (2013.01); *B01D 53/1425* (2013.01);
(Continued)

(58) Field of Classification Search
CPC .......... B01D 2252/204; B01D 53/1412; B01D 53/1418; B01D 53/1425; B01D 53/1475; B01D 53/18
See application file for complete search history.

(56) References Cited

U.S. PATENT DOCUMENTS

| | | |
|---|---|---|
| 2012/0260801 A1 | 10/2012 | Iijima |
| 2013/0315809 A1 | 11/2013 | Shimamura |

(Continued)

FOREIGN PATENT DOCUMENTS

| | | |
|---|---|---|
| JP | 38-013604 B1 | 7/1963 |
| JP | 2012-166139 A | 9/2012 |

(Continued)

OTHER PUBLICATIONS

Machine translation of JP-2012223661-A from ESPACENET (Year: 2019).*

(Continued)

*Primary Examiner* — Cabrena Holecek
(74) *Attorney, Agent, or Firm* — Osha Liang LLP

(57) ABSTRACT

A $CO_2$ recovery system includes: a $CO_2$ absorber that transports flue gas with $CO_2$ into contact with a $CO_2$ absorbent to remove the $CO_2$ and discharges a rich solution that has absorbed the $CO_2$; an absorbent regenerator that separates the $CO_2$ from the rich solution to regenerate the $CO_2$ absorbent as a lean solution; a gas discharge line where a $CO_2$ entrained gas from the absorbent regenerator is discharged; a reflux water drum that produces reflux water by separating $CO_2$ and water from the $CO_2$ entrained gas; a separation-gas discharge line where the separated $CO_2$ is discharged; a compressor that compresses the separated $CO_2$ gas; a condensate water drum that forms compressor condensate water by separating water from the compressed $CO_2$ gas to form compressor condensate water; and a compressor-condensate water line that supplies the compressor condensate water as in-system or out-of-system supply water.

6 Claims, 8 Drawing Sheets

(52) U.S. Cl.
CPC ......... *B01D 53/1475* (2013.01); *B01D 53/18* (2013.01); *B01D 2252/204* (2013.01); *B01D 2257/504* (2013.01)

(56) References Cited

U.S. PATENT DOCUMENTS

| | | |
|---|---|---|
| 2015/0233577 A1 | 8/2015 | Iijima |
| 2016/0136566 A1 | 5/2016 | Chiba et al. |
| 2016/0288049 A1 | 10/2016 | Tanaka et al. |

FOREIGN PATENT DOCUMENTS

| | | | |
|---|---|---|---|
| JP | 2012-223661 A | | 11/2012 |
| JP | 2012223661 A | * | 11/2012 |
| JP | 2014-108389 A | | 6/2014 |
| JP | 2015-077581 A | | 4/2015 |
| JP | 2016-093788 A | | 5/2016 |
| WO | 2014-087943 A1 | | 6/2014 |

OTHER PUBLICATIONS

International Search Report and Written Opinion corresponding to International Application No. PCT/JP2019/008223, dated Apr. 16, 2019 (9 pages).

\* cited by examiner

$CO_2$ RECOVERY SYSTEM AND METHOD OF RECOVERING $CO_2$

TECHNICAL FIELD

The present invention relates to a $CO_2$ recovery system and a method of recovering $CO_2$ which are capable of efficiently using water within a system.

BACKGROUND

In recent years, as one of the causes of a global warming phenomenon, a greenhouse effect caused by $CO_2$ has been pointed out, and there has been an urgent need, internationally as well, to take measures to protect the global environment. The generation source of $CO_2$ extends over all fields of human activities that burn fossil fuel and the demand for its emission reduction tends to be further intensified. Along with this, for power generation facilities such as thermal power plants that use a large amount of fossil fuel, a way of removing and recovering $CO_2$ of flue gas by bringing the flue gas of a boiler into contact with, for example, amine-based $CO_2$ absorbent, and a way of storing the recovered $CO_2$ without releasing it to the atmosphere have been actively studied.

As a method of removing and recovering $CO_2$ from the flue gas by using $CO_2$ absorbent, there is employed a $CO_2$ recovery system that brings the flue gas into contact with the $CO_2$ absorbent in an absorber, heats up in a regenerator the absorbent that has absorbed $CO_2$ to separate $CO_2$ and regenerate the absorbent, and circulates the regenerated absorbent in the absorber again for reusing. In this $CO_2$ recovery system, in terms of maintaining the water balance of the absorbent within the system, it is desired that the supply of water from the outside of the system be suppressed to a minimum, by using water generated within the system as much as possible. Thus, it is conceived that a regenerator reflux device is installed to condense, as reflux water, water contained in emission gas with which $CO_2$ discharged from the regenerator is entrained, and the reflux water is circulated and reused with, for example, a reclaiming device (Patent Literature 1: Japanese Patent Application Laid-open No. 2012-166139).

However, according to the conception in Patent Literature 1, because the reflux water includes a slight amount of absorption component, it is not possible to efficiently recover the absorption component in the operation of reclaiming. In addition, the measures taken at non-stationary time when the carry-over from the regenerator occurs in some operating conditions are not sufficient.

Furthermore, it is desired that compressor condensate water generated in compressing $CO_2$ in the flue gas discharged from the regenerator be effectively used.

SUMMARY

According to one or more embodiments of the present invention, a $CO_2$ recovery system includes a $CO_2$ absorber configured to bring flue gas containing $CO_2$ into contact with a $CO_2$ absorbent to remove $CO_2$ from the flue gas, an absorbent regenerator configured to separate $CO_2$ from a rich solution that has absorbed $CO_2$ to regenerate the $CO_2$ absorbent as a lean solution, a gas discharge line to which a $CO_2$ entrained gas discharged from a top of the absorbent regenerator is discharged, a reflux water drum provided in the gas discharge line to separate water in the $CO_2$ entrained gas as reflux water, a separation-gas discharge line to which a $CO_2$ gas separated by the reflux water drum is discharged, a compressor provided in the separation-gas discharge line to compress the separated $CO_2$ gas, a condensate water drum provided in the separation-gas discharge line to separate water in the separated $CO_2$ gas as compressor condensate water, and a compressor-condensate water line connected to the condensate water drum to supply the compressor condensate water separated from the condensate water drum as in-system supply water or out-of-system supply water.

According to one or more embodiments of the present invention, a method is of circulating and reusing with a $CO_2$ absorber a $CO_2$ absorbent for which $CO_2$ is removed by an absorbent regenerator. The $CO_2$ absorber is configured to bring flue gas containing $CO_2$ into contact with a $CO_2$ absorbent to remove $CO_2$ from the flue gas. The absorbent regenerator is configured to separate $CO_2$ from a rich solution that is a $CO_2$ absorbent having absorbed $CO_2$ to regenerate the $CO_2$ absorbent as a lean solution. The method includes the steps of separating water in a $CO_2$ entrained gas discharged from a top of the absorbent regenerator as reflux water, compressing a $CO_2$ gas separated by a reflux water drum, separating water in the compressed $CO_2$ gas as compressor condensate water. The compressor condensate water is used as in-system supply water or out-of-system supply water.

DETAILED DESCRIPTION

The following describes embodiments of the present invention in detail with reference to the accompanying drawings. The present invention, however, is not intended to be limited by the following exemplary embodiments of the invention. The constituent elements in the following embodiments include those that are easily assumed by a person skilled in the art, that are substantially identical, and that are within a scope of what is called equivalents. Moreover, the constituent elements disclosed in the following embodiments can be combined as appropriate.

The embodiments of the invention can effectively use, within a system and outside the system, compressor condensate water for which the water contained in compressed $CO_2$ that was generated in recovering $CO_2$ is condensed.

When this compressor condensate water is used as reclaiming water in an absorbent regeneration (reclaimer) process within the system, because the $CO_2$ absorbent component is hardly contained in the compressor condensate water, the recovery efficiency of the $CO_2$ absorbent component in a reclaiming residue in the reclaimer process is improved. When the compressor condensate water is used in pump equipment within the system, it can be suitably used as pump seal water because of no impurities.

When the condenser compressed water is discharged and used outside the system, the reduction in the amount of emissions of entrained absorbent (entrained amine solution) entrained in emission gas discharged from a $CO_2$ absorber to the outside can be achieved, by lowering the discharging temperature of the emission gas for which $CO_2$ discharged from a top of the absorber has been removed and by retaining the water balance within the system.

Figure 1:
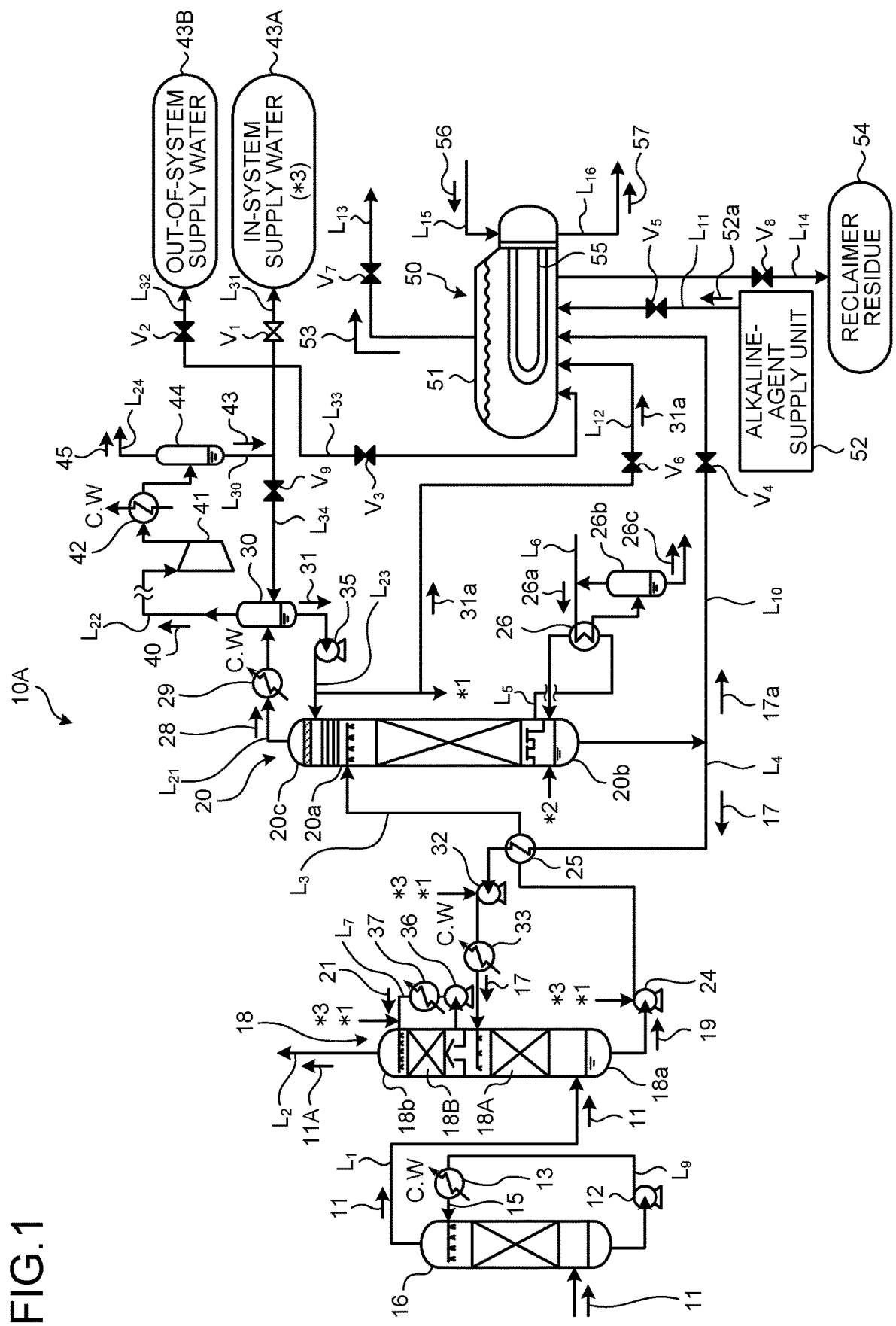
FIG. 1 is a schematic diagram illustrating a $CO_2$ recovery system according to one or more embodiments.

FIG. 1 is a schematic diagram illustrating a $CO_2$ recovery system according to one or more embodiments.

As illustrated in FIG. 1, a $CO_2$ recovery system 10A according to one or more embodiments includes a flue gas cooling tower (hereinafter also referred to as "cooling tower") 16 that cools flue gas 11 containing $CO_2$ discharged from, for example, a boiler, a gas turbine, and the like by cooling water 15, a $CO_2$ absorber (hereinafter also referred to as "absorber") 18 including a $CO_2$ recovery unit 18A that removes $CO_2$ from the flue gas 11 by bringing (i.e., transporting) the flue gas 11 containing the cooled $CO_2$ into contact with a $CO_2$ absorbent (hereinafter also referred to as "absorbent") 17 that absorbs $CO_2$, and an absorbent regenerator (hereinafter also referred to as "regenerator") 20 that regenerates the $CO_2$ absorbent 17 by releasing $CO_2$ from a $CO_2$ absorbent 19 that has absorbed $CO_2$ (hereinafter also referred to as "rich solution"). Then, in this $CO_2$ recovery system 10A, the regenerated absorbent (hereinafter also referred to as "lean solution") 17 for which $CO_2$ has been removed by the absorbent regenerator 20 is sent to the $CO_2$ absorber 18 and is circulated and reused as the $CO_2$ absorbent.

The cooling tower 16 is disposed on a gas supply line $L_1$ to which the flue gas 11 is supplied, and the cooling water 15 is circulated by a pump 12 disposed on a cooling-water circulation line $L_9$. Then, after being cooled by a cooler 13 that is disposed on the cooling-water circulation line $L_9$, the cooling water 15 is supplied into the cooling tower 16 and cools the supplied flue gas 11 down to a certain temperature.

The absorber 18 includes the $CO_2$ recovery unit 18A and a washing unit 18B. The $CO_2$ recovery unit 18A removes $CO_2$ in the flue gas 11 by the $CO_2$ absorbent 17. The flue gas 11 for which $CO_2$ has been removed is cleaned with washing liquid 21 in the washing unit 18B placed on the upper side on the downstream side of gas flow of the $CO_2$ recovery unit 18A. In the washing unit 18B, the washing water 21 is circulated by a pump 36 disposed on a washing-water circulation line $L_7$. Then, after being cooled by a cooler 37 that is disposed on the washing-water circulation line $L_7$, the washing water 21 is supplied into the washing unit 18B and washes the flue gas 11 that goes through and for which $CO_2$ has been removed while cooling it down to a certain temperature. At this time, the $CO_2$ absorbent entrained in the flue gas 11 is washed with the washing liquid 21 and the $CO_2$ absorbent entrained in emission gas 11A discharged to the outside is prevented from discharging, thereby achieving the reduction in emissions. The temperature of cooling the flue gas 11 is substantially identical to the supply temperature of the flue gas 11 in supplying it into the absorber 18, thereby maintaining the water balance within the system. For example, when the water content in the flue gas 11 that is supplied into the absorber 18 is 10 wt %, the cooling temperature is adjusted such that the water content of the emission gas 11A discharged from the top of the absorber 18 is also 10 wt %.

In the absorber 18 and the regenerator 20, a rich-solution supply line $L_3$ that discharges the rich solution from a bottom portion 18a of the absorber 18 and supplies the rich solution 19 toward the regenerator 20 side and a lean-solution supply line $L_4$ that discharges the lean solution 17 from a bottom portion 20b of the regenerator 20 and supplies it toward the absorber 18 side are connected intersecting with each other. At the intersection of the rich-solution supply line $L_3$ and the lean-solution supply line $L_4$, a rich/lean-solution heat exchanger 25 is disposed. In this rich/lean-solution heat exchanger 25, the rich solution 19 is heated by the lean solution 17 that is regenerated in the regenerator 20, and is supplied to the absorbent regenerator 20. Between the rich/lean-solution heat exchanger 25 and the absorber 18, a lean solution pump 32 that raises the pressure of the lean solution 17 and a lean solution cooler 33 that cools the lean solution 17 by cooling water (C.W) are disposed, and after being raised in pressure and cooled, the lean solution 17 is supplied into the $CO_2$ absorber 18.

On the bottom portion 20b side of the regenerator 20, a reboiler 26 disposed on a reboiler line $L_5$ is provided. In this reboiler 26, in circulating a part of the lean solution 17 in the reboiler line $L_5$, it is indirectly heated by saturated water vapor 27 and the water vapor is supplied to the inside of the regenerator 20. In the reboiler 26, a saturated-water vapor supply line $L_6$ that supplies the saturated water vapor 26a is provided. On this saturated-water vapor supply line $L_6$, a separation drum 26b is disposed that separates vapor condensate water 26c.

As for the $CO_2$ recovery system 10A, there are a case in which it is retrofitted in order to recover $CO_2$ from an existing flue gas source and a case in which it is placed along a newly equipped flue gas source at the same time. In the line of the flue gas 11, an openable and closeable dumper is installed, and is opened when the $CO_2$ recovery system 10A is in operation.

In the method of recovering $CO_2$ using this $CO_2$ recovery system 10A, first of all, the flue gas 11 containing $CO_2$ from a boiler, a gas turbine, and the like, for example, is sent to a flue gas cooling device 16 after having raised the pressure by a flue gas blower (not depicted), and is cooled therein by the cooling water 15 and sent to the $CO_2$ absorber 18.

In the $CO_2$ absorber 18, the flue gas 11 makes countercurrent contact with the $CO_2$ absorbent 17 using an amine-based absorption agent, for example. Then, the $CO_2$ in the flue gas 11 is absorbed in the $CO_2$ absorbent 17 by chemical reaction. The $CO_2$-removed flue gas after having removed the $CO_2$ in the $CO_2$ recovery unit 18A makes gas-liquid contact with the circulating washing water 21 containing the $CO_2$ absorbent supplied from a nozzle in the water washing unit 18B in the $CO_2$ absorber 18, and the $CO_2$ absorbent 17 entrained in the $CO_2$-removed flue gas is recovered. Furthermore, the emission gas 11A for which the $CO_2$ has been removed is released outside the system by a gas discharge line $L_2$ connected to the top portion. The rich solution 19 that has absorbed $CO_2$ is raised in pressure by a rich solution pump 24 and, at the rich/lean-solution heat exchanger 25, is heated by the lean solution 17 that was regenerated by the absorbent regenerator 20 (the other of the lean solution 17 is cooled by the heat exchange) and is supplied to the absorbent regenerator 20.

The rich solution 19 released to the inside from a lateral upper portion 20a side of the absorbent regenerator causes an endothermic reaction by the water vapor supplied from the bottom portion 20b side, thereby desorbing and releasing most of $CO_2$. The $CO_2$ absorbent that released in the absorbent regenerator 20 a part or most of $CO_2$ is referred to as semi-lean solution. This semi-lean solution becomes, by the time it reaches the bottom portion 20b of the absorbent regenerator 20, the lean solution 17 for which almost all $CO_2$ has been removed. As for this lean solution 17, a part thereof is heated up by the saturated water vapor 26a in the reboiler 26 and supplies the water vapor for $CO_2$ desorption to the inside of the absorbent regenerator 20.

Meanwhile, in a top portion 20c of the absorbent regenerator 20, a gas discharge line $L_{21}$ that discharges $CO_2$ entrained gas 28 entrained in water vapor released from the rich solution 19 and the semi-lean solution in the regenerator, is connected. This gas discharge line $L_{21}$ is provided with a cooler 29 that cools the $CO_2$ entrained gas 28 entrained in water vapor and a reflux water drum 30 that flashes the $CO_2$ entrained gas 28 after cooling for gas-liquid separation. Reflux water 31 that has been separated and refluxed from the $CO_2$ entrained gas 28 entrained in water vapor in the reflux water drum 30 is supplied by a reflux-water circulation pump 35 disposed on a reflux water line $L_{23}$ to the upper portion of the absorbent regenerator 20 and to the washing water 21 side (*1).

At the top portion of the reflux water drum 30, a separation-gas discharge line $L_{22}$ that discharges separated $CO_2$ gas 40 is connected. This separation-gas discharge line $L_{22}$ is provided with a compressor 41 that compresses the $CO_2$ gas, a cooler 42 that cools the compressed gas, and a condensate water drum 44 that separates compressor condensate water 43 for which water vapor is condensed by the compressor 41. $CO_2$ gas 45 that was separated by the condensate water drum 44 is discharged to the outside of the system via a gas discharge line $L_{24}$, is separately compressed by a compressor, and is recovered. This recovered $CO_2$ gas 45 is injected into an oilfield by using enhanced oil recovery (EOR) or is reserved into an aquifer to achieve measures against global warming, for example.

A plurality of compressors 41 may be placed, and in that case, there are multiple compressors 41 and multiple condensate water drums 44, and a plurality of drums of compressor condensate water is obtained. In the following description, according to one or more embodiments, a case in which a single compressor 41 and a single condensate water drum 44 are placed will be explained.

At the bottom portion of the condensate water drum 44, a compressor-condensate water line $L_{30}$ that discharges the compressor condensate water 43 is connected. To this compressor-condensate water line $L_{30}$, connected are a first compressor-condensate water line $L_{31}$ that supplies the compressor condensate water 43 as in-system supply water 43A, a second compressor-condensate water line $L_{32}$ that supplies the compressor condensate water 43 as out-of-system supply water 43B, and a third compressor-condensate water line $L_{33}$ in which the distal end is connected to a reclaiming device 50 and that supplies the compressor condensate water 43 as reclaiming water. Note that, first to third on-off valves $V_1$ to $V_3$ are disposed, respectively, in the first to third compressor-condensate water lines $L_{31}$ to $L_{33}$.

The reclaiming device 50 is, for example, a pressurized reclaiming device and includes a reclaimer 51 that draws, as lean drawn liquid 17a, a part of the lean solution 17 to a branch line $L_{10}$ from the lean-solution supply line $L_4$ that supplies the lean solution 17 regenerated in the regenerator 20. The reclaimer 51 also takes in and reserves the lean drawn liquid 17a thus drawn liquid.

This reclaimer 51 is provided with an alkaline-agent supply unit 52 that supplies an alkaline agent 52a to the inside via an alkaline supply line $L_{11}$, a reflux-water supply line $L_{12}$ that supplies reflux water 31a inside the reclaimer 51, the third compressor-condensate water line $L_{33}$ that supplies the compressor condensate water 43, a recovery-steam discharge line $L_{13}$ that supplies recovery steam 53 discharged from the reclaimer 51 into the bottom portion 20b side of the regenerator 20, and a residue discharge line $L_{14}$ that discharges a reclaimer residue 54. Note that, in the branch line $L_{10}$, the alkaline supply line $L_{11}$, the reflux-water supply line $L_{12}$, the recovery-steam discharge line $L_{13}$, and the residue discharge line $L_{14}$, fourth to eighth on-off valves $V_4$ to $V_8$, respectively, are disposed.

The reclaiming device 50 draws out the lean solution 17 from a branch portion of the lean-solution supply line $L_4$ before reaching the rich/lean-solution heat exchanger 25 from the regenerator 20 via the branch line $L_{10}$ as the lean drawn liquid 17a and reserves it inside the reclaimer 51, heats it in a pressurized condition at high temperature (for example, 120 to 150° C.), and returns the absorption component, which was vaporized from the lean drawn liquid 17a, to the bottom portion 20b side of the regenerator 20 as the recovery steam 53, while discharging the reclaimer residue 54 that was enriched by heating.

The reclaiming device 50 mainly includes an absorbent reservoir and a heating unit. The absorbent reservoir is configured as the reclaimer 51 of airtight vessel that reserves the lean drawn liquid 17a. This heating unit is provided inside the reclaimer 51, and is made up of a horizontal U-shaped steam pipe 55, a steam supply line $L_{15}$ that is connected to one end of the steam pipe 55 and that supplies saturated water vapor 56 that is produced by being heated with a heat source (not depicted) outside the reclaimer 51, and a condensate-water discharge line $L_{16}$ that is connected to the other end of the steam pipe 55 and discharges steam condensate water 57 to the outside of the reclaimer 51.

This reclaiming device 51 opens the fourth on-off valve $V_4$ and supplies the lean drawn liquid 17a to the inside of the reclaimer 51, opens the fifth on-off valve $V_5$ and supplies the alkaline agent 52a to the inside of the reclaimer 51 from the alkaline-agent supply unit 52, opens the third on-off valve $V_3$ and the sixth on-off valve $V_6$ and supplies supply water (the compressor condensate water 43 and the reflux water 31a) to the inside of the reclaimer 51, and lets the saturated water vapor 56 go through in the steam line $L_{15}$. Accordingly, the supplied lean drawn liquid 17a and the supply water (the compressor condensate water 43 and the reflux water 31a) are heated to, for example, 120 to 150° C. by heat exchange in a non-contact manner. Then, deteriorated materials that are non-volatile materials contained in the lean drawn liquid 17a produce salt with the alkaline agent 52a to separate the salt from the absorption component, and are enriched as the reclaimer residue 54 in the reclaimer 51.

This reclaimer residue 54 includes liquid components (liquid components including the absorption component that was not recovered, the alkaline agent, and the supply water, and liquid components of non-volatile materials) in the reclaimer 51, and solid components of non-volatile components. This reclaimer residue 54 is discharged to the outside of the reclaimer 51 by opening the eighth on-off valve $V_8$. The discharged reclaimer residue 54 is processed by incineration disposal or the like, for example.

Meanwhile, the water in the reclaimer 51 (the lean drawn liquid 17a, the reflux water 31a, and the compressor condensate water 43) is evaporated by the heating of the steam pipe 55. At this time, the amine-based absorbent that was freed by decomposition of the alkaline agent 52a is vaporized by the heating. The recovery steam 53 in which this vaporized absorption component is entrained passes through the opened seventh on-off valve $V_7$ and, through the recovery-steam discharge line $L_{13}$, is returned to the bottom portion 20b side of the regenerator 20 (*2). Accordingly, the deteriorated materials contained in the lean drawn liquid 17a are separated, and a situation in which the deteriorated materials are accumulated in the absorbent circulating inside the system of the recovery system 10 can be prevented.

The principle of reclaiming of amine-based absorbent by using sodium hydroxide as the alkaline agent will be described. By adding and mixing the alkaline agent 52a such as sodium hydroxide to the lean drawn liquid 17a containing the absorption component (including amine nitrate, amine sulfate, and the like) that is fixed by the deteriorated materials and a part of impurities (including nitrate salt, hydrosulfate, and the like, for example), and by heating the mixture, the amine absorption component that became a free state is recovered together with water as the recovery steam 53, and the non-volatile materials (impurities, including sodium nitrate, sodium sulfate, and the like) are separated and discharged to the outside of the system as the reclaimer residue (liquid and solid) 54.

The compressor condensate water 43 that is separated at the compressor-condensate water line $L_{30}$ from the condensate water drum 44 is, broadly speaking, divided into in-system supply water 43A supplied by the first compressor-condensate water line $L_{31}$ that is the water used within the system, and into out-of-system supply water 43B supplied by the second compressor-condensate water line $L_{32}$ that is the water used outside the system.

Mode 1 of Using Compressor Condensate Water within System

In the following description, according to one or more embodiments, a mode in which the compressor condensate water 43 that is separated at the compressor-condensate water line $L_{30}$ from the condensate water drum 44 is used as the in-system supply water 43A that is the water used within the system will be explained.

As for the water used within the system, it needs to consider the water balance within the system of the $CO_2$ recovery system 10A. When the in-system supply water 43A is used, the second on-off valve $V_2$ and the third to ninth on-off valves $V_3$ to $V_9$ are closed. Then, the in-system supply water 43A is made to connect to the washing-water circulation line $L_7$ that circulates through the washing unit 18B of the absorber 18 via the end portion of the first compressor-condensate water line $L_{31}$. The in-system supply water 43A and the washing water 21 are then made to merge so as to increase the percentage of water in the washing water 21 and decrease the concentration of the absorption component in the washing water 21.

When the compressor condensate water 43 is used as mechanical seal water of various circulation pumps, by connecting the end portion of the first compressor-condensate water line $L_{31}$ to the rich solution pump 24 and the lean solution pump 32 (*3), it is used as the mechanical seal water, for the pumps. Accordingly, this makes it unnecessary to supply the seal water from the outside. Consequently, this can prevent the absorbent from being diluted by the water supply from the outside. In using the reflux water 31 in the pump equipment within the system, there is a risk of mixture of solid content such as soot dust when it is in a non-stationary operation condition in which a failure such as flooding occurs at the top portion 20c of the regenerator 20. However, because that risk of the compressor condensate water is low, the reduction in the risk of damaging pump seal can be achieved.

Mode 2 of Using Compressor Condensate Water within System

Incidentally, as the $CO_2$ recovery system is continuously operated, the impurities in the $CO_2$ absorbent increases. Thus, it needs to perform $CO_2$ absorbent component regeneration operation (reclaimer operation) for removing these deteriorated materials on a regular basis. This reclaimer operation can be performed in conjunction with the $CO_2$ recovery operation. When performing this reclaimer operation, the compressor condensate water 43 is used as reclaiming water.

FIGS. 2 to 5 are schematic diagrams illustrating the $CO_2$ recovery system according to one or more embodiments. In the following description, with reference to FIGS. 2 to 5, a case in which the reclaimer operation is performed will be explained.

Reclaimer Operation

Figure 2:
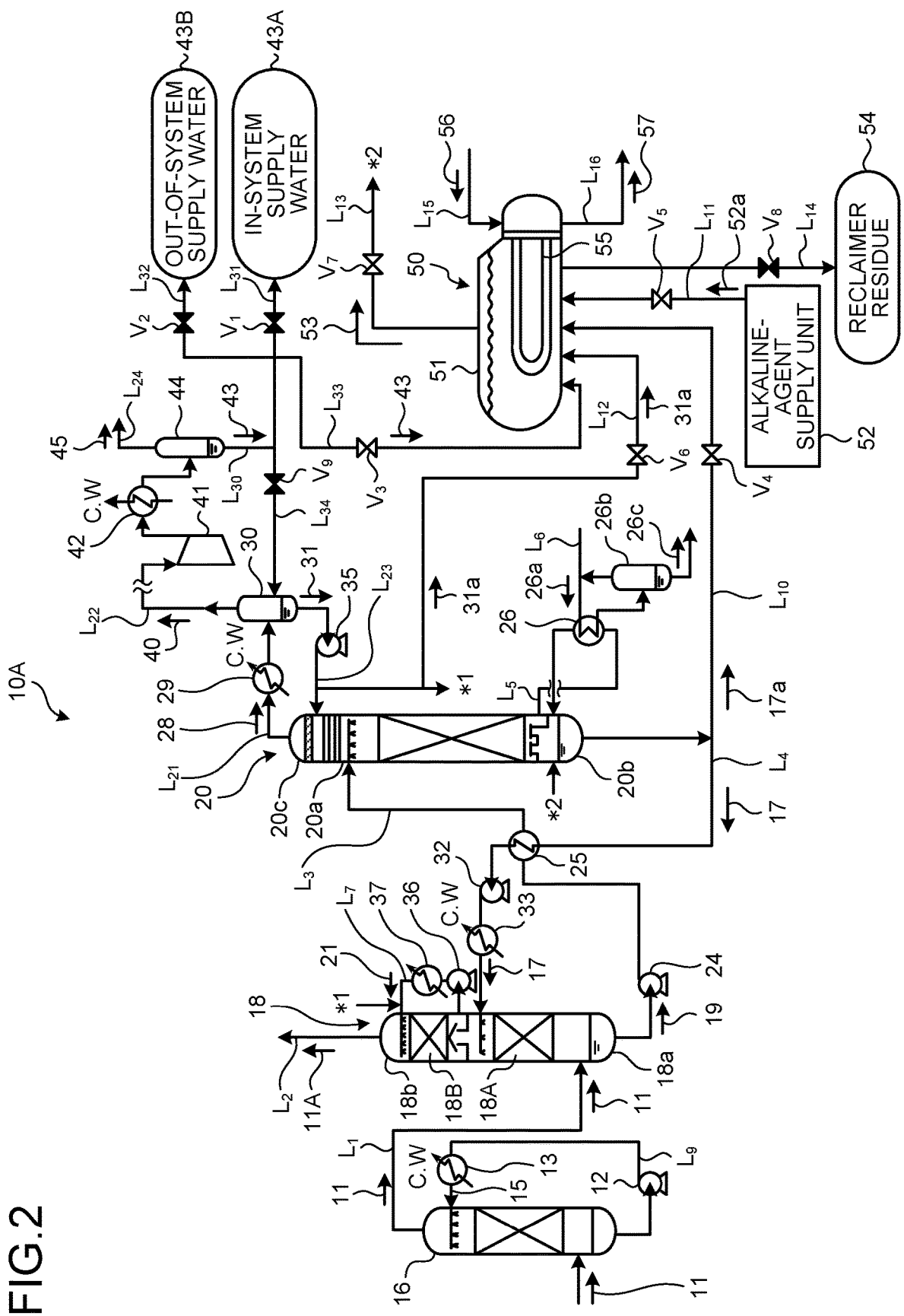
FIG. 2 is a schematic diagram illustrating the $CO_2$ recovery system according to one or more embodiments.

As illustrated in FIG. 2, when using the in-system supply water 43A as the reclaiming water of the reclaimer operation, by closing the first, the second, and the ninth on-off valves $V_1$, $V_2$, and $V_9$ and by opening the third on-off valve $V_3$, the compressor condensate water 43 is supplied into the reclaimer 51 by the third compressor-condensate water line $L_{33}$ as the reclaimer water. By opening the fourth on-off valve $V_4$ and supplying the lean drawn liquid 17a to the inside of the reclaimer 51, by opening the fifth on-off valve $V_5$ and supplying the alkaline agent 52a to the inside of the reclaimer 51 from the alkaline-agent supply unit 52, by opening the sixth on-off valve $V_6$ and supplying the reflux water 31a to the inside of the reclaimer 51, and by letting the saturated water vapor 56 go through in the steam supply line $L_{15}$, the supplied lean drawn liquid 17a and the supply water (the compressor condensate water 43 and the reflux water 31a) are heated to, for example, 120 to 150° C. by heat exchange in a non-contact manner. Then, the deteriorated materials that are non-volatile materials included in the lean drawn liquid 17a produce salt with the alkaline agent 52a to separate the salt from the absorption component, and the reclaimer residue 54 is enriched.

When it is verified that the deteriorated materials in the $CO_2$ absorbent reached a certain concentration, by closing the fourth on-off valve $V_4$ of the branch line $L_{10}$ and the fifth on-off valve $V_5$ of the alkaline supply line $L_{11}$ and by stopping the supply of the lean drawn liquid 17a and the alkaline agent 52a, the reclaimer operation is ended.

Subsequently, a recovery operation that recovers the $CO_2$ absorption component from the enriched solution of the reclaimer 51 is performed.

This recovery operation is divided into an early-stage recovery operation (early stage of recovery) that recovers the $CO_2$ absorption component that constitutes the $CO_2$ absorbent, and into a late-stage recovery operation (late stage of recovery) that performs finishing recovery of the $CO_2$ absorption component that constitutes the $CO_2$ absorbent.

Figure 3:
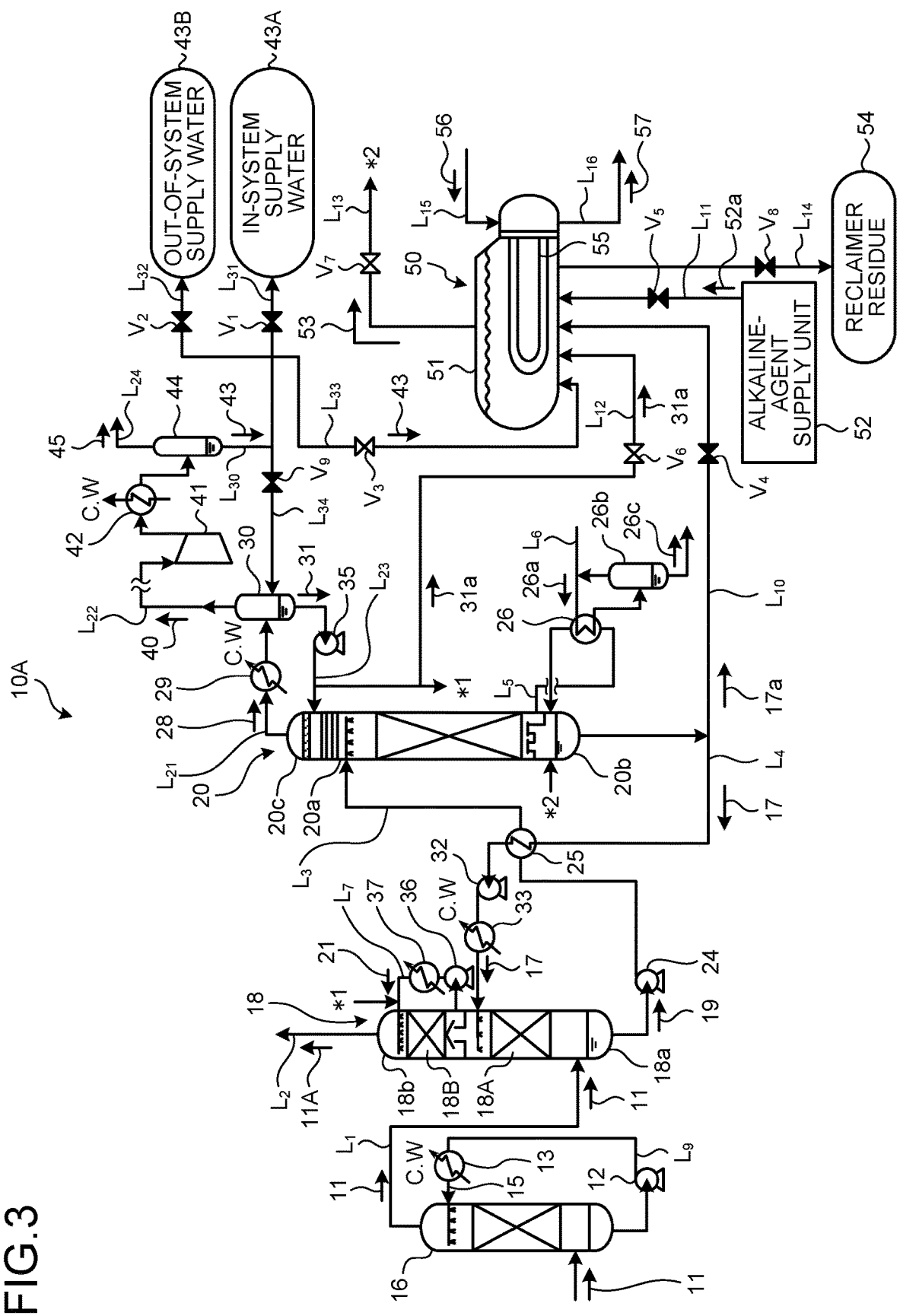
FIG. 3 is a schematic diagram illustrating the $CO_2$ recovery system according to one or more embodiments.
Figure 4:
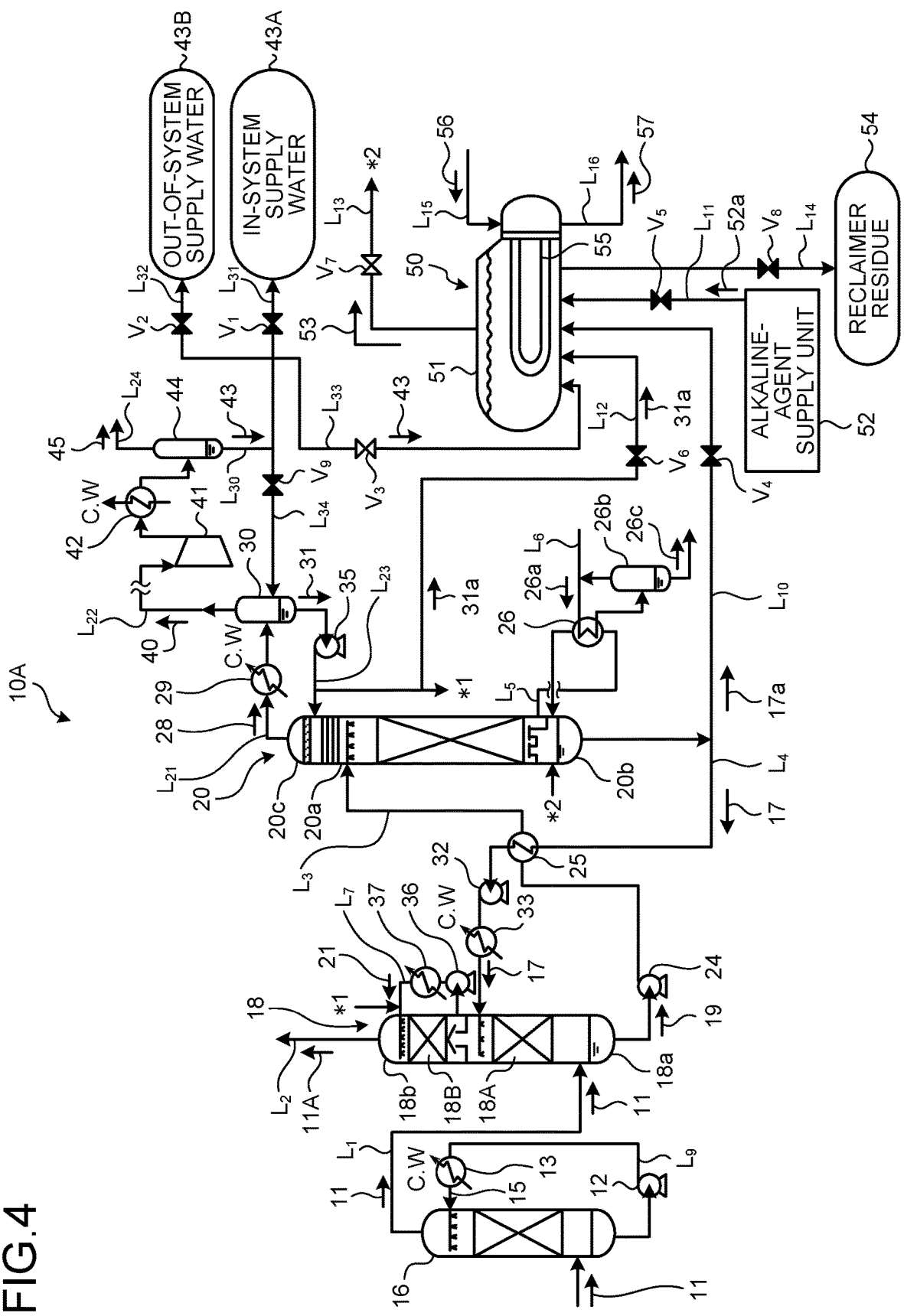
FIG. 4 is a schematic diagram illustrating the $CO_2$ recovery system according to one or more embodiments.

FIG. 3 illustrates a case of an early stage of recovery of the recovery operation recovering the $CO_2$ absorption component, and FIG. 4 illustrates a case of a late stage of recovery of the recovery operation recovering the $CO_2$ absorption component.

Early Stage of Recovery

In the early stage of recovery, as the supply water to the reclaimer 51, the reflux water 31a and the compressor condensate water 43 are used.

As illustrated in FIG. 3, when using the supply water 43A as the reclaiming water at the early stage of recovery of the reclaimer operation, while keeping the first, the second, the fourth, and the ninth on-off valves $V_1$, $V_2$, $V_4$, and $V_9$ closed and keeping the third on-off valve $V_3$ and the seventh on-off valve $V_7$ open, by supplying the in-system supply water 43A and the reflux water 31a into the reclaimer 51 as the compressor condensate water 43, the $CO_2$ absorption component remaining in the residual liquid is recovered by making it entrained in the recovery steam 53.

Late Stage of Recovery

In the late stage of recovery, as the supply water to the reclaimer 51, only the compressor condensate water 43 is used.

As illustrated in FIG. 4, when using the supply water as the reclaiming water at the late stage of recovery of the reclaimer operation, by further closing the sixth on-off valve $V_6$ from the case of FIG. 3, stopping the supply of the reflux water 31a, and supplying only the compressor condensate water 43 into the reclaimer 51, the $CO_2$ absorption component of a very small amount remaining in the reclaimer residual water is recovered by making it entrained in the recovery steam 53.

This is because the $CO_2$ absorption component remains (remaining amount: several wt %) in the reflux water 31a, and when the $CO_2$ absorption component remains, due to vapor-liquid equilibrium, the vaporization rate of the $CO_2$ absorption component entrained in the recovery steam 53 is decreased.

Thus, in the late stage of recovery, by using the compressor condensate water 43 for which the remaining $CO_2$ absorption component is of zero or a very small amount and that is compressed by the compressor, further improvement in the recovery rate can be achieved.

Reclaimer Residue Discharge

Figure 5:
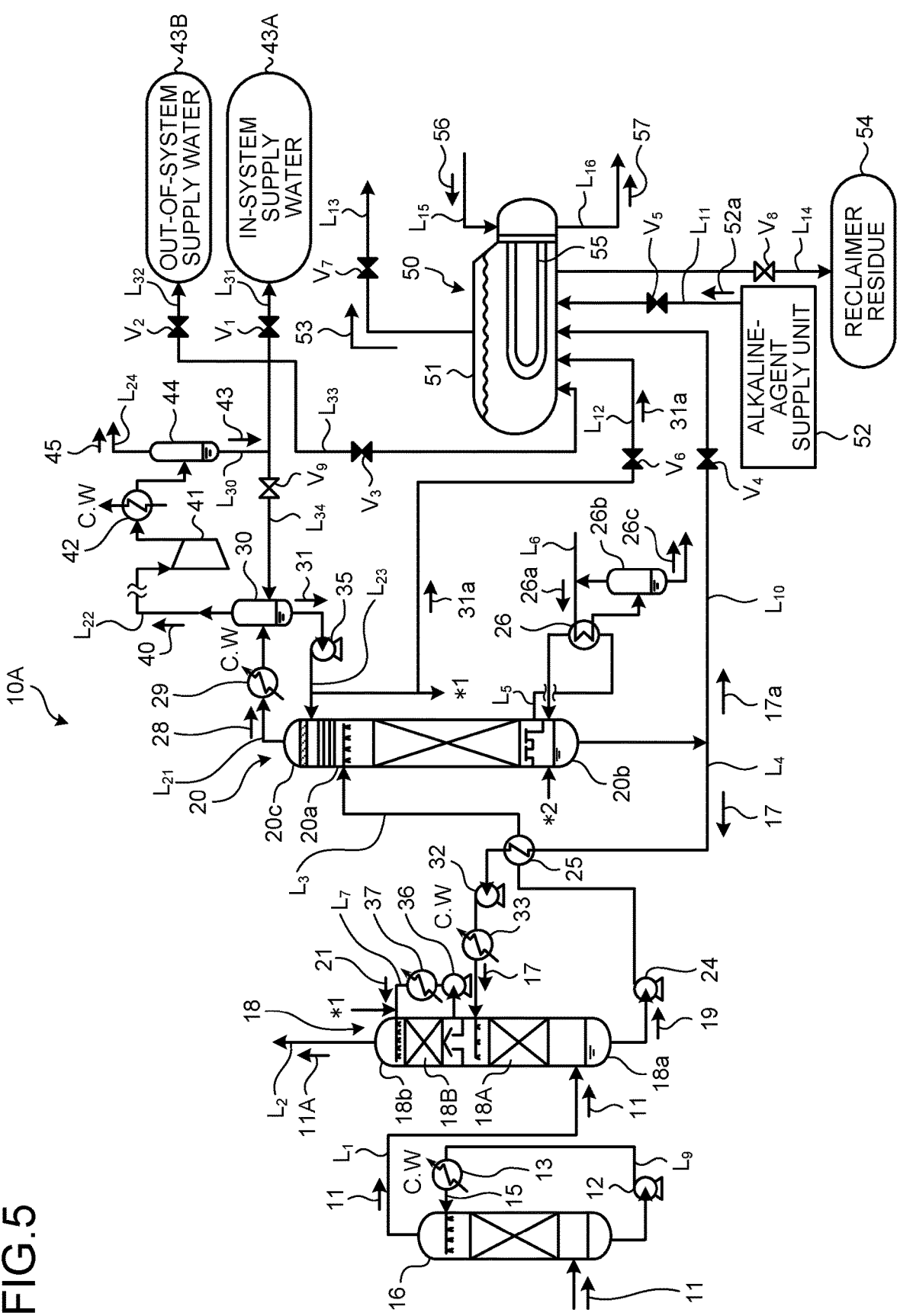
FIG. 5 is a schematic diagram illustrating the $CO_2$ recovery system according to one or more embodiments.

After the recovery of $CO_2$ absorption component is finished, as illustrated in FIG. 5, by further closing the third on-off valve $V_3$ from the case of FIG. 4 and stopping the supply of the compressor condensate water 43 to the reclaimer 51, and by opening the ninth on-off valve $V_9$ of a fourth compressor condensate water line $L_{34}$ and supplying the compressor condensate water 43 to the reflux water drum as the in-system supply water, the water balance is retained. Then, by opening the eighth on-off valve $V_8$ of the residue discharge line $L_{14}$ and operating a residue discharge pump (not depicted), the reclaimer residue 54 is discharged to the outside of the reclaimer 51.

Figure 6:
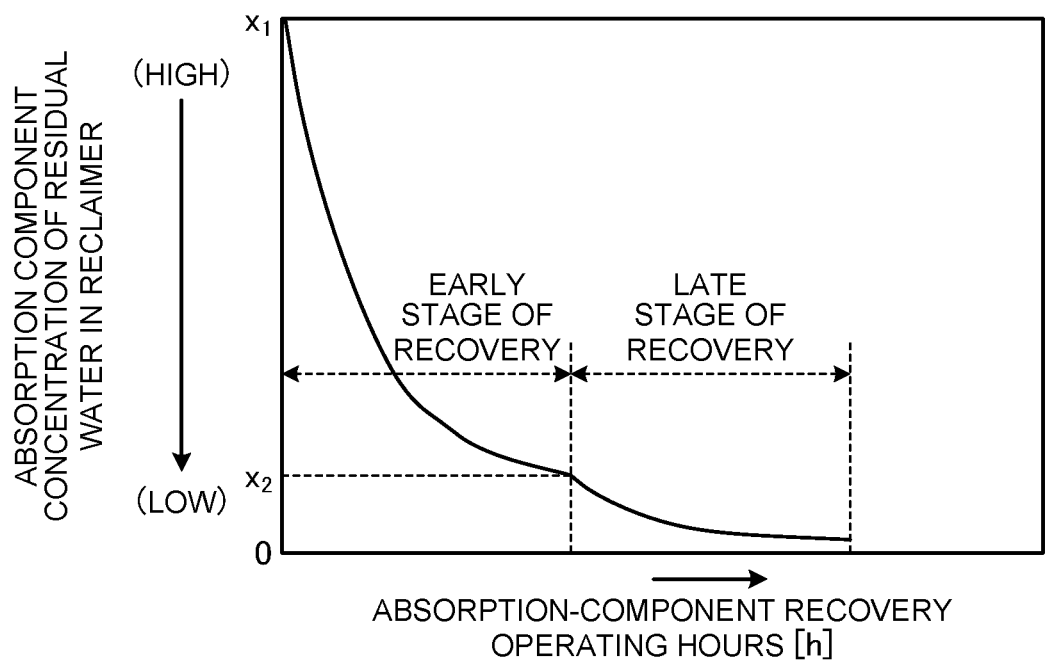
FIG. 6 is a diagram illustrating a relation between the operating hours (h) of absorption-agent recovery operation and the absorption agent concentration (wt %) of residual water in a reclaimer according to one or more embodiments.

FIG. 6 is a diagram illustrating the relation between the operating hours (h) of absorption component recovery operation and the absorption component concentration (wt %) of residual water in the reclaimer.

water to the reclaimer 51. At the latter half of the early stage of recovery, the recovery efficiency of the absorption component is reduced, and the curvature of the recovery curve becomes gentle and reaches a low concentration $x_2$. When it reached this low concentration $x_2$, by using only the compressor condensate water 43 as the supply water to the reclaimer 51 and by further vaporizing the remaining $CO_2$ absorption component, the improvement in the recovery efficiency of the $CO_2$ absorption component is achieved.

As a result of this, as compared with a conventional case in which the reflux water 31a is used as the reclaiming water to the reclaimer 51, by using the compressor condensate water 43 for which the mix ratio of the absorption component is zero or very low, the improvement in the recovery efficiency of the $CO_2$ absorption component can be achieved. Thus, the effective use of the $CO_2$ absorption component remaining in the residual water that has conventionally been discharged to the outside of the system as the reclaimer residue 54 and lost can be achieved.

Table 1 illustrates one example of an annual schedule of recovering $CO_2$ in the flue gas by using the $CO_2$ recovery system. However, embodiments of the present invention are not limited thereto.

In the present description, the $CO_2$ recovery system processes the flue gas at all times and is operated without stopping except for the maintenance and the like. Although the reclaimer processing depends also on the use frequency and the operating temperature of the $CO_2$ absorbent, it is implemented several times a year, for example. This implementation is conducted a predetermined number of times. Alternatively, by analyzing the concentration of the deteriorated materials of the $CO_2$ absorbent circulating in the circulatory system, if the result of the analysis exceeds a prescribed value, a part of the $CO_2$ absorbent circulating in the circulatory system is drawn out and supplied to the reclaimer and, while the deteriorated materials are separated and removed from the $CO_2$ absorbent by adding the alkaline agent to the reclaimer, the $CO_2$ absorption component is returned to the circulatory system.

In the present description, conducting the reclaimer operation twice a year as one example will be explained. In the annual schedule, for one to four weeks in Jun. and Dec., a part of the lean solution 17 is drawn out to the reclaiming device 50 as the lean drawn liquid 17a, and the reclaimer operation is conducted.

Accordingly, except for this reclaimer operation, as illustrated in FIG. 1, the compressor condensate water 43 that is the compressor condensate water is used for the pump seal water as the in-system supply water 43A, for example. Then, when the reclaimer operation is conducted, as illustrated in FIGS. 2 to 5, the use as the pump seal water is stopped and the compressor condensate water 43 is supplied into the reclaimer 51 as the reclaiming water.

TABLE 1

|  | Annual schedule | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| In-system supply water (43A) | ON | --------> | | | ON | OFF | ON | --------> | | | ON | OFF |
| Reclaiming water | OFF | --------> | | | OFF | ON | OFF | --------> | | | OFF | ON |

Figure 7:
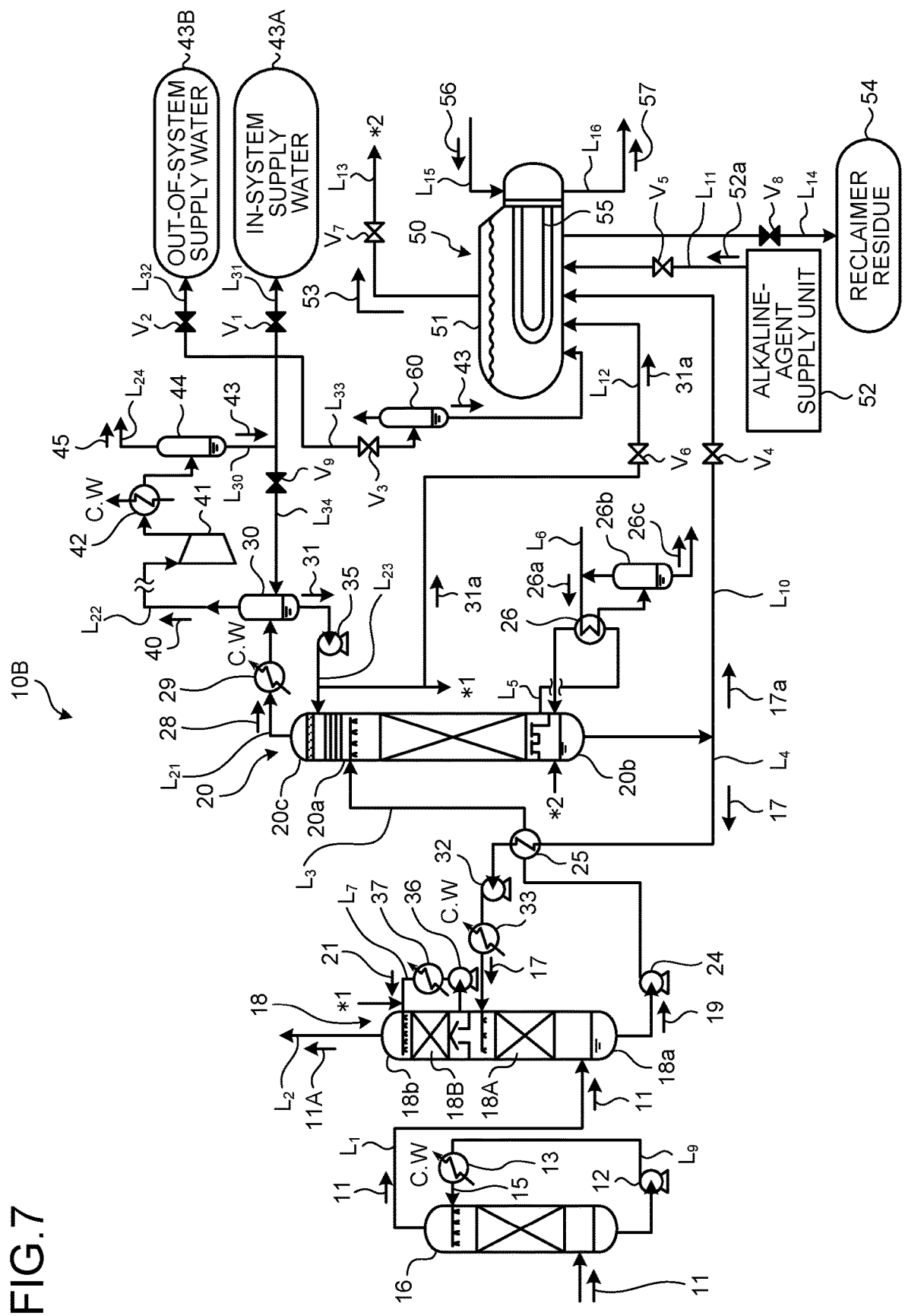
FIG. 7 is a schematic diagram illustrating a $CO_2$ recovery system according to one or more embodiments.

As illustrated in FIG. 6, at the end time of the reclaimer operation, when the concentration of the absorption component is high as $x_1$, the reflux water 31a and the compressor condensate water 43 are used in combination as the supply FIG. 7 is a schematic diagram illustrating a $CO_2$ recovery system according to one or more embodiments.

The constituent members identical to those of one or more embodiments described above are given identical reference signs and redundant descriptions are omitted. As illustrated in FIG. 7, a $CO_2$ recovery system 10B according to one or more embodiments has a flash drum 60 disposed on the third compressor-condensate water line $L_{33}$. This flash drum 60 removes the $CO_2$ gas in the compressor condensate water 43, and it prevents supplying gas components in the reclaimer operation and improves the recovery efficiency of the $CO_2$ absorption component.

Figure 8:
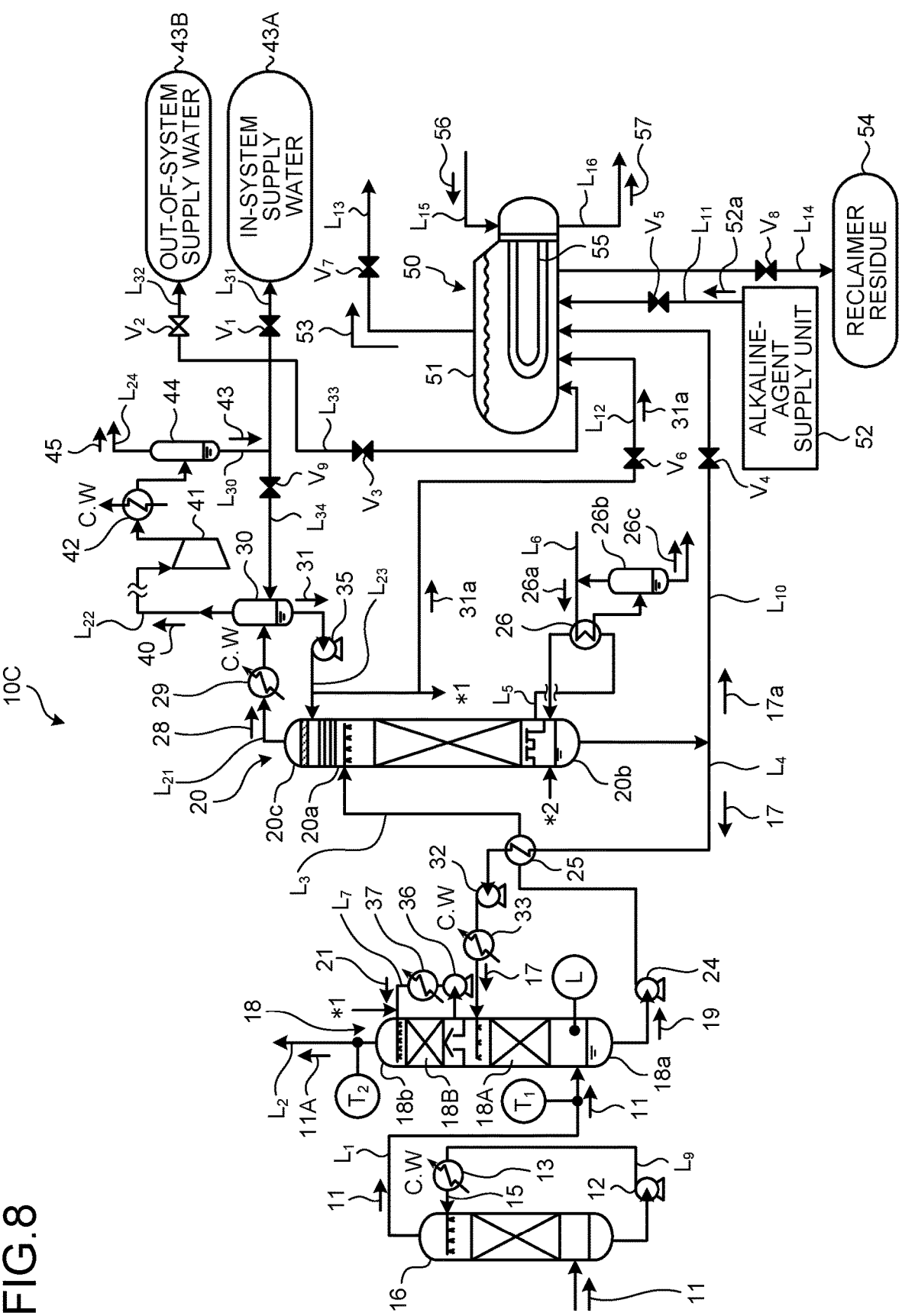
FIG. 8 is a schematic diagram illustrating a $CO_2$ recovery system according to one or more embodiments.

FIG. 8 is a schematic diagram illustrating a $CO_2$ recovery system according to one or more embodiments.

The constituent members identical to those of one or more embodiments described above are given identical reference signs and redundant descriptions are omitted. As illustrated in FIG. 8, in a $CO_2$ recovery system 10C according to one or more embodiments, an inlet thermometer $T_1$ that measures inlet gas temperature $(t_1)$ in the gas supply line $L_1$ that supplies the flue gas 11 into the absorber 18 and an outlet thermometer $T_2$ that measures the outlet gas temperature $(t_2)$ of the emission gas discharged from a top portion 18b of the absorber 18 are placed in the $CO_2$ recovery system 10A of one or more embodiments described above.

In the following description, according to one or more embodiments, the mode in which the compressor condensate water 43 that is separated at the compressor-condensate water line $L_{30}$ from the condensate water drum 44 is used as the out-of-system supply water 43B that is the water used outside the system will be explained.

The out-of-system supply water 43B that is used outside the system is used in utilities of the system and is, for example, used as the supply water for the water vapor of the saturated water vapor 27 supplied to the reboiler 26 and as make-up water of the cooling water used in the cooling tower.

When it is used outside the system, it needs to make the amount of discharge smaller than the carried-in amount of water in the flue gas 11 supplied into the absorber 18.

According to one or more embodiments, the outlet gas temperature $(t_2)$ of the emission gas 11A discharged from the absorber is adjusted to be lower than the inlet gas temperature $(t_1)$ of the flue gas 11 supplied into the absorber 18, thereby keeping the water balance. In other words, because the inside of the system is a closed system, adjustment is needed for the water discharged to the outside. Accordingly, when the compressor condensate water 43 is used as the out-of-system supply water 43B, the inlet thermometer $(T_1)$ that measures the temperature of the flue gas 11 supplied into the absorber 18 and the outlet thermometer $(T_2)$ that measures the temperature of the emission gas 11A discharged from the $CO_2$ absorber are provided, and the operation is conducted by lowering the outlet gas temperature $(t_2)$ of the emission gas 11A than the inlet gas temperature $(t_1)$ of the flue gas 11, thereby making it possible to ensure the water used outside the system.

In a bottom liquid-pool portion of the bottom portion 18a of the absorber 18, a liquid level meter L is installed, and the liquid level is monitored. Accordingly, the liquid level in the bottom liquid-pool portion can be properly maintained. As a result, in the $CO_2$ recovery system, the reduction in the amount of water intake from the outside can be achieved.

Table 2 illustrates the comparison between the case of using the compressor condensate water 43 as the out-of-system supply water 43B and the case of using it as the in-system supply water 43A.

When the compressor condensate water is used as the out-of-system supply water 43B, the inlet thermometer $(T_1)$ that measures the temperature of the flue gas 11 supplied into the absorber 18 and the outlet thermometer $(T_2)$ that measures the temperature of the emission gas 11A discharged from the absorber 18 are provided, and the operation is conducted by lowering the outlet gas temperature $(t_2)$ of the emission gas 11A than the inlet gas temperature $(t_1)$ of the flue gas 11. Accordingly, because the gas temperature of the emission gas 11A is lowered, the entrained amount of the $CO_2$ absorbent entrained in the emission gas 11A is reduced and the reduction in emissions is achieved.

As one example, when the amount of water in the flue gas 11 supplied into the absorber 18 is 7.3 vol % and the inlet gas temperature $(t_1)$ is 40° C., assuming the outlet gas temperature $(t_2)$ of the emission gas 11A discharged from the top 18b of the absorber 18 is 38° C., the water of 0.8 vol % of the flue gas is to be obtained.

Meanwhile, in operating as the in-system supply water 43A so as to retain the water balance, when the amount of water in the flue gas 11 supplied into the absorber 18 is 7.3 vol % and the inlet gas temperature $(t_1)$ is 40° C., the outlet gas temperature $(t_2)$ of the emission gas 11A discharged from the top 18b of the absorber 18 is set to 41° C. and is maintained constant so that the water content of the emission gas 11A on the outlet side becomes the water content in the flue gas 11 supplied into the absorber 18. The temperatures and the amounts of water, however, are examples, and should not be used to limit one or more embodiments of the present invention.

TABLE 2

|  | Out-of-system supply water 43B (Reboiler steam water, etc.) | In-system supply water 43A (Washing water, reclaiming water, etc.) |
| --- | --- | --- |
| Absorber inlet gas temperature $(t_1)$ | 40° C. (Water content: 7.3 vol %) | 40° C. (Water content: 7.3 vol %) |
| Outlet gas temperature $(t_2)$ | 38° C. (Water content: 6.5 vol %) | 41° C. (Water content: 7.6 vol %) |
| Water reduction | 0.8 vol % | — |

As just described, when the compressor condensate water 43 is used as the out-of-system supply water 43B, the discharge of the $CO_2$ absorption component entrained in the emission gas 11A discharged to the outside can be prevented and the reduction in emissions can be achieved.

In a case in which the operation to obtain the out-of-system supply water 43B and the operation of reclaimer operation are used in combination, as illustrated in Table 3, in the present description, conducting the reclaimer operation twice a year as one example will be explained. In the annual schedule, for one to three weeks in Jun. and Dec., a part of the lean solution 17 is drawn out to the reclaiming device as the lean drawn liquid 17a, and the reclaimer operation is conducted. Accordingly, except for this reclaimer operation, as illustrated in FIG. 8, the compressor condensate water 43 that is the compressor condensate water is used as the out-of-system supply water 43B, for example, as the supply water for the water vapor of the saturated water vapor 27 supplied to the reboiler 26 and as the make-up water of the cooling water used in the cooling tower.

TABLE 3

| | Annual schedule | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Out-of-system supply water (43B) | ON | --------> | | | ON | OFF | ON | --------> | | | ON | OFF |
| Reclaiming water | OFF | --------> | | | OFF | ON | OFF | --------> | | | OFF | ON |

Then, when the reclaimer operation is conducted, as illustrated in FIGS. 2 to 5, the use as the pump seal water is stopped and the compressor condensate water 43 is supplied into the reclaimer 51 as the reclaiming water. According to one or more embodiments, because it is used as the out-of-system supply water 43B, the discharge of the $CO_2$ absorption component entrained in the emission gas 11A discharged to the outside can be prevented and the reduction in emissions can be achieved.

In addition, as the out-of-system supply water 43B, it can also be used, for example, as the substitute of the make-up water of the utility facilities that are peripherals, or as a part thereof. At this time, a removal device such as an ion exchange resin is installed, for example. As a result, the $CO_2$ absorption component of an infinitesimal amount included in the compressor condensate water 43 can be removed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A $CO_2$ recovery system comprising:
    a $CO_2$ absorber that:
        transports flue gas comprising $CO_2$ into contact with a $CO_2$ absorbent to remove the $CO_2$ from the flue gas, and
        discharges a rich solution that has absorbed the $CO_2$;
    an absorbent regenerator that separates the $CO_2$ from the rich solution to regenerate the $CO_2$ absorbent as a lean solution;
    a gas discharge line where a $CO_2$ entrained gas, discharged from a top portion of the absorbent regenerator, is discharged;
    a reflux water drum, disposed in the gas discharge line, that produces reflux water by separating the $CO_2$ and water from the $CO_2$ entrained gas;
    a separation-gas discharge line where the $CO_2$ separated by the reflux water drum is discharged;
    a compressor disposed in the separation-gas discharge line that compresses the separated $CO_2$ gas;
    a condensate water drum, disposed in the separation-gas discharge line, that produces compressor condensate water by separating the water from the compressed $CO_2$ gas; and
    a compressor-condensate water line, connected to the condensate water drum, that supplies the compressor condensate water as in-system supply water or out-of-system supply water; and
    a reclaiming device that regenerates the $CO_2$ absorbent, wherein
    the reclaiming device is connected to an end portion of the compressor-condensate water line and includes:
        a branch line that draws a part of the lean solution as lean drawn liquid,
        a reclaimer that takes in and reserves the lean drawn liquid,
        an alkaline-agent supply unit that supplies an alkaline agent into the reclaimer via an alkaline supply line,
        a reflux-water supply line that supplies the reflux water into the reclaimer,
        a recovery-steam discharge line that supplies recovery steam discharged from the reclaimer to a bottom portion side of the absorbent regenerator, and
        a heating unit that heats an inside of the reclaimer.

2. The $CO_2$ recovery system according to claim 1, wherein the in-system supply water is reclaiming water for the reclaiming device.

3. The $CO_2$ recovery system according to claim 1, wherein the reclaiming device is subjected to, after regeneration of the $CO_2$ absorbent is completed:
    an early-stage recovery operation that:
        closes the branch line and stops supplying the lean drawn liquid into the reclaimer, and
        recovers a $CO_2$ absorption component that forms the $CO_2$ absorbent, and
    a late-stage recovery operation that:
        closes the reflux-water supply line to stop supplying the reflux water into the reclaimer, and
        performs finishing recovery of the $CO_2$ absorption component using the compressor condensate water.

4. The $CO_2$ recovery system according to claim 1, further comprising a flash drum that separates gas from the compressor condensate water to be supplied into the reclaiming device.

5. The $CO_2$ recovery system according to claim 1, further comprising:
    an inlet thermometer that measures a temperature of the flue gas to be supplied to the $CO_2$ absorber;
    an outlet thermometer that measures a temperature of emission gas discharged from the $CO_2$ absorber, wherein
    the $CO_2$ recovery system uses the compressor condensate water as the out-of-system supply water by regulating the temperature of the emission gas to be lower than the temperature of the flue gas.

6. A method of circulating and reusing, with a $CO_2$ absorber, a $CO_2$ absorbent with the $CO_2$ removed by an absorbent regenerator, the $CO_2$ absorber brings flue gas comprising the $CO_2$ into contact with the $CO_2$ absorbent to remove the $CO_2$ and discharges a rich solution that has absorbed the $CO_2$, the absorbent regenerator separates the $CO_2$ from the rich solution to regenerate the $CO_2$ absorbent as a lean solution, the method comprising:
    separating, by a reflux water drum, the $CO_2$ and water from a $CO_2$ entrained gas discharged from a top portion of the absorbent regenerator to produce reflux water;
    compressing the $CO_2$ separated by the reflux water drum; and
    separating water from the compressed $CO_2$ gas to form compressor condensate water; and conducting a reclaimer operation of the $CO_2$ absorbent by using the reflux water and the compressor condensate water in a reclaiming device, wherein the compressor condensate water is used as in-system supply water or out-of-system supply water, and conducting the reclaimer operation includes:
- after regenerating of the $CO_2$ absorbent is completed,
- an early-stage recovery operation that stops supplying a lean drawn liquid that is part of the lean solution into the reclaiming device, and that recovers a $CO_2$ absorption component constituting the $CO_2$ absorbent, and
- a late-stage recovery operation that stops supplying the reflux water into the reclaiming device, and that performs finishing recovery of the $CO_2$ absorption component constituting the $CO_2$ absorbent using the compressor condensate water.

* * * * *